United States Patent
Bonnefoy

(10) Patent No.: US 11,987,361 B2
(45) Date of Patent: May 21, 2024

(54) CONSOLE FOR A SEAT UNIT PROVIDED WITH A SUPPORT ARM FOR A PORTABLE ELECTRONIC DEVICE

(71) Applicant: Safran Seats, Plaisir (FR)

(72) Inventor: Bastien Bonnefoy, Issoudun (FR)

(73) Assignee: Safran Seats, Plaisir (FR)

( * ) Notice: Subject to any disclaimer, the term of this patent is extended or adjusted under 35 U.S.C. 154(b) by 220 days.

(21) Appl. No.: 17/535,348

(22) Filed: Nov. 24, 2021

(65) Prior Publication Data
US 2022/0194587 A1 Jun. 23, 2022

(30) Foreign Application Priority Data
Nov. 30, 2020 (FR) .................................... 2012404

(51) Int. Cl.
*B64D 11/00* (2006.01)
*B64D 11/06* (2006.01)

(52) U.S. Cl.
CPC ...... *B64D 11/0015* (2013.01); *B64D 11/0601* (2014.12); *B64D 11/0605* (2014.12)

(58) Field of Classification Search
CPC ............ B64D 11/0015; B64D 11/0601; B64D 11/0605; B64D 11/0602; B64D 11/0606; B64D 11/0638; B64D 11/0646
See application file for complete search history.

(56) References Cited

U.S. PATENT DOCUMENTS

| | | | | |
|---|---|---|---|---|
| 5,179,447 A * | 1/1993 | Lain | ........................ | A47C 7/723 348/827 |
| 5,562,049 A * | 10/1996 | Hoffman | .............. | A47B 17/065 297/188.17 |
| 8,616,137 B2 * | 12/2013 | Collins | .............. | B64D 11/0601 297/135 |
| 9,150,129 B2 * | 10/2015 | Suhre | .................. | B64D 11/0644 |
| 9,820,568 B2 * | 11/2017 | Johnson | .................. | A47B 23/02 |

(Continued)

FOREIGN PATENT DOCUMENTS

| | | | | |
|---|---|---|---|---|
| CA | 2867297 C | * | 10/2016 | ............. B64D 11/06 |
| WO | 2013136080 A2 | | 9/2013 | |

(Continued)

OTHER PUBLICATIONS

Omoton fully foldable tablet stand sold on amazon dated Oct. 19, 2020, https://www.amazon.com/Foldable-OMOTON-Adjustable-Aluminum-Compatible/dp/B08LDNFFSX (Year: 2020).*

(Continued)

*Primary Examiner* — Terrell L McKinnon
*Assistant Examiner* — Ding Y Tan
(74) *Attorney, Agent, or Firm* — Kilpatrick Townsend & Stockton LLP

(57) ABSTRACT

The present invention relates to a console for a seat unit comprising:
- an upper wall forming a table surface on which a passenger can place objects,
- a cavity,
- an articulated arm fixed to an internal face of the cavity,
- said articulated arm comprising a holding device for a portable electronic device provided with a screen,
- said articulated arm being movable between a stored position, in which the articulated arm is located inside the cavity, and a extended position in which the articulated arm is at least in part outside the cavity.

8 Claims, 2 Drawing Sheets

(56) References Cited

U.S. PATENT DOCUMENTS

| | | | |
|---|---|---|---|
| 10,562,634 B2* | 2/2020 | Marais | B64D 11/0638 |
| 10,744,921 B2 | 8/2020 | Ruiz et al. | |
| 2012/0133180 A1* | 5/2012 | Moulton | B64D 11/06 |
| | | | 297/135 |
| 2017/0253160 A1* | 9/2017 | Gow | A47B 23/06 |
| 2019/0061953 A1* | 2/2019 | Fishel | B64D 11/0638 |
| 2019/0061954 A1* | 2/2019 | Miedema | A47B 3/00 |
| 2019/0308538 A1* | 10/2019 | Buchanan | B60N 3/004 |
| 2020/0216177 A1 | 7/2020 | White et al. | |
| 2020/0354063 A1 | 11/2020 | Satterfield | |

FOREIGN PATENT DOCUMENTS

| | | |
|---|---|---|
| WO | 2018178276 A1 | 10/2018 |
| WO | 2018187070 A1 | 10/2018 |
| WO | WO-2018187070 A1 * 10/2018 | ............ B60N 3/002 |
| WO | 2019186091 A1 | 10/2019 |
| WO | 2020193289 A1 | 10/2020 |

OTHER PUBLICATIONS

Anozer tablet foldable stand sold on amazon dated Jun. 2, 2020, https://www.amazon.com/Anozer-Foldable-Adjustable-Extendable-Compatible/dp/B089K6C49L (Year: 2020).*

Neewer smartphone holder sold on amazon dated Sep. 18, 2017, https://www.amazon.com/Neewer-Smartphone-Holder-Vertical-Bracket/dp/B075R229KH (Year: 2017).*

France Patent Application No. 2012404, Search Reported, dated Jul. 29, 2021.

* cited by examiner

[Fig. 1]
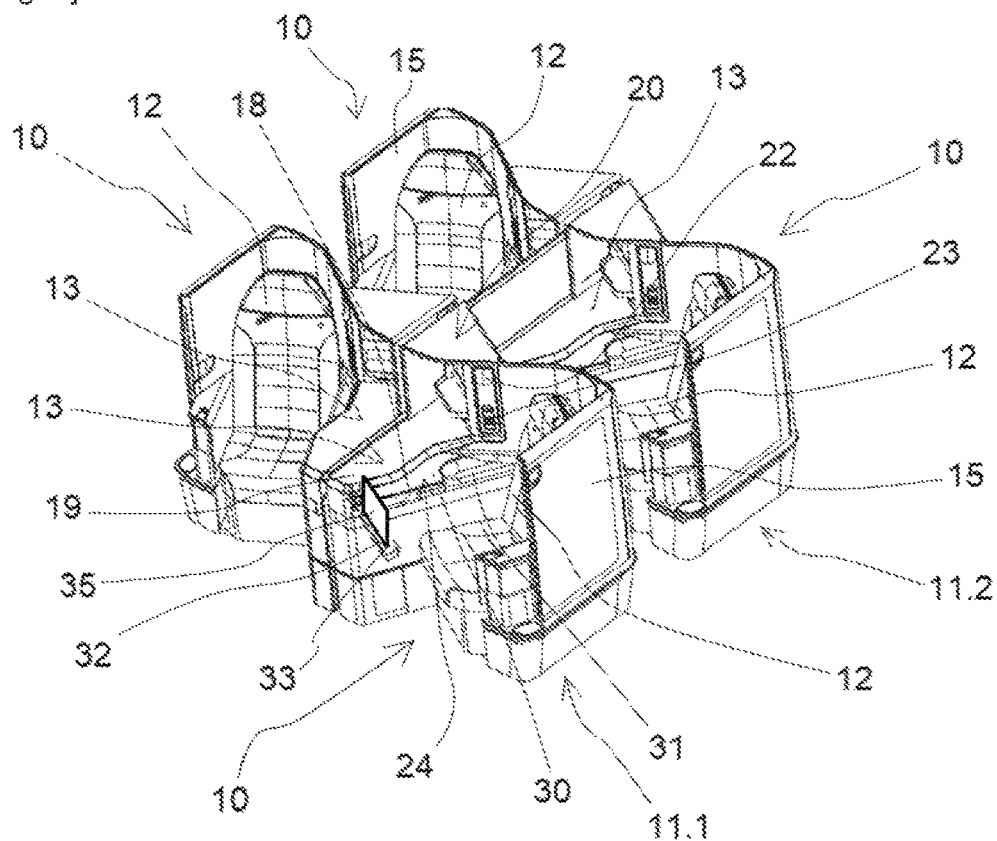
[Fig. 2]
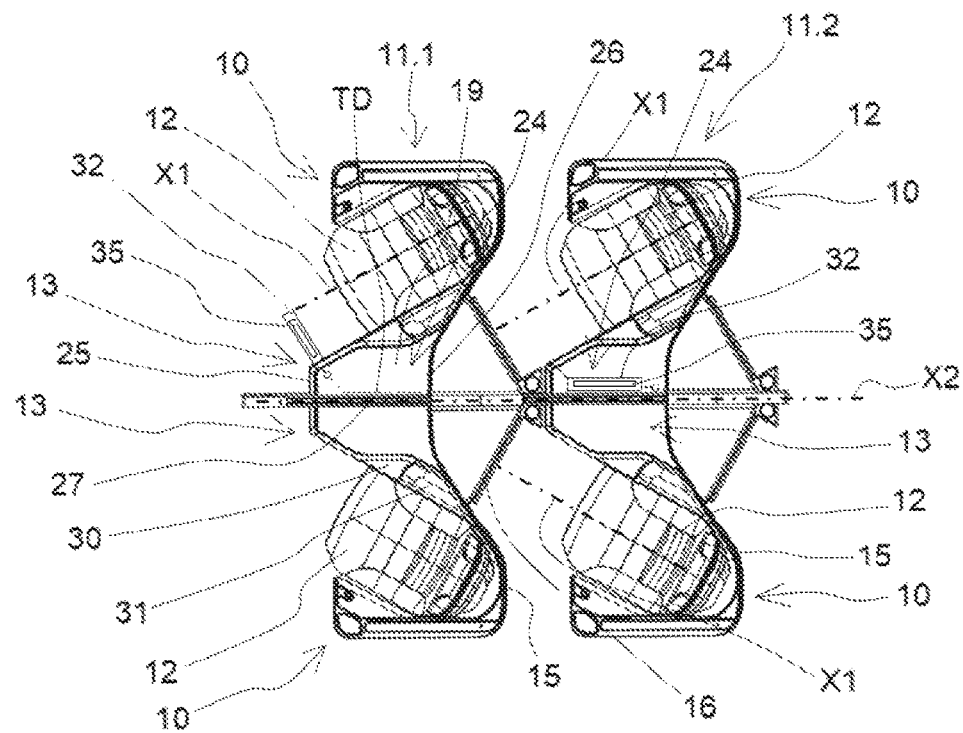

[Fig. 3]
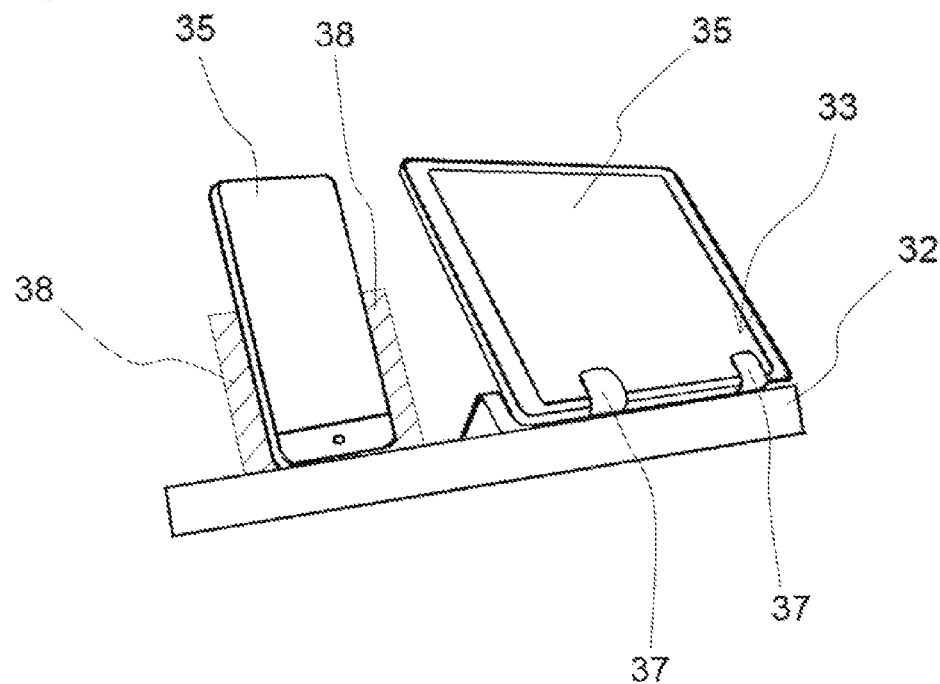
[Fig. 4]
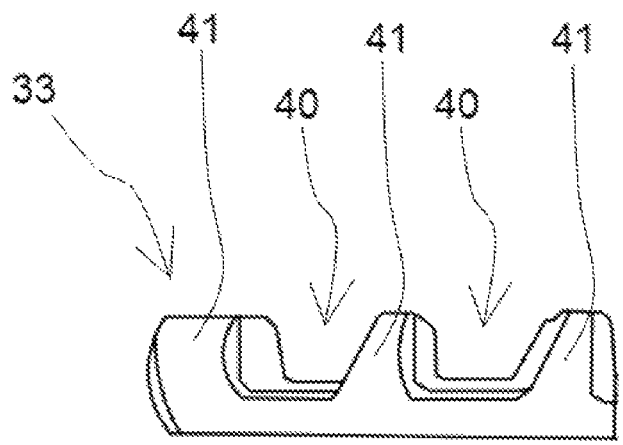

CONSOLE FOR A SEAT UNIT PROVIDED WITH A SUPPORT ARM FOR A PORTABLE ELECTRONIC DEVICE

CROSS-REFERENCE TO RELATED APPLICATIONS

This application claims the priority benefit of France Patent Application No. 2012404 filed on Nov. 30, 2020, the contents of which are hereby incorporated by reference in its entirety.

FIELD OF THE INVENTION

The present invention relates to a console for a seat unit provided with a support arm for a portable electronic device. The invention finds a particularly desirable application with seat units of the "business class" and "first class" type.

BACKGROUND

In a manner known per se, such a seat unit comprises a seat associated with a side console extending along one side of the seat and with a shell extending at least in part around the seat so as to define a semi-enclosed space around the passenger. Such a configuration makes it possible to guarantee the privacy of the passenger on the seat.

The seat offers the passenger various comfort positions, from a "sitting" position to a "lying" position, in which the seat defines a substantially horizontal lying surface on which the passenger can lie down.

Intermediate comfort positions are also offered, such as the "relaxing" position in which a backrest of the seat is strongly inclined. Generally, these intermediate positions are obtained when inclining the backrest pivoting about a horizontal axis perpendicular to an axis of extension of the seat. The passenger can then remain in the seat during transitions between the different positions. The seat generally comprises the backrest and a seating surface and is likely to include a legrest and/or a footrest, which can be fixed or linked to a kinematics of the seat.

It is known practice to equip seat units with a removable support for holding a portable electronic device, such as a touch-sensitive electronic tablet or a mobile phone of the Smartphone type, in the axis of the seat. If the support is integrated in a meal shelf, the passenger will not be able to use it when the meal shelf is used to place his/her meal tray thereon or when the meal shelf is in the stored position.

SUMMARY

The invention aims in particular at effectively remedying this drawback by providing a console for a seat unit comprising:
- an upper wall forming a table surface on which a passenger can place objects,
- a cavity located under the upper wall forming a table surface,
- an articulated arm fixed on an internal face of the cavity, said articulated arm comprising a device for holding a portable electronic device provided with a screen,
- said articulated arm being movable between a stored position, in which the articulated arm is located inside the cavity, and an extended position in which the articulated arm is located at least partly outside the cavity.

The invention thus makes it possible to use the articulated arm to hold a portable electronic device independently of the meal tablet. The invention is also economical in nature, insofar as its simple implementation does not require significant modifications to the configuration of the console of the seat unit.

According to one embodiment of the invention, the cavity extends vertically between on the one hand a horizontal face having in particular an armrest function and on the other hand the upper wall of the console.

According to one embodiment of the invention, the articulated arm is configured to move in a horizontal plane so as to move from one position to another.

According to one embodiment of the invention, when the articulated arm is in the stored position, said articulated arm is positioned against a face of the cavity.

According to one embodiment of the invention, the articulated arm is configured such that, in the extended position, the device for holding a portable electronic device is located along an axis of extension of a seat.

According to one embodiment of the invention, the articulated arm is movable in rotation and/or in translation with respect to the cavity in order to move from one position to another.

According to one embodiment of the invention, the holding device comprises holding tabs to be placed on either side of the portable electronic device.

According to one embodiment of the invention, the holding device comprises at least one groove for receiving an edge of the portable electronic device.

According to one embodiment of the invention, the holding device comprises at least two jaws capable of gripping at least a portion of the portable electronic device.

The object of the invention is also a seat unit comprising a seat and a console as defined above.

The present invention will be better understood and other features and advantages will become apparent on reading the following detailed description including embodiments, given as illustrative examples, with reference to the accompanying figures, given as non-limiting examples, which could be used to completely understand the present invention and the description of its implementation and which could contribute, if need be, to its definition, in which:

BRIEF DESCRIPTION OF THE DRAWINGS

FIG. 1 is a perspective view of several seat units, one of which is provided with an articulated arm carrying a portable electronic device shown in the extended position;

FIG. 2 is a top view of an assembly of seat units illustrating the stored position and the extended position of an articulated arm according to the invention provided with a device for holding a portable electronic device showing therethrough inside the cavity of a console;

FIG. 3 shows exemplary embodiments of devices for holding a portable electronic device integrated in the articulated arm according to the invention;

FIG. 4 is a side view of an alternative embodiment of a device for holding a portable electronic device which can be integrated in the articulated arm according to the invention.

DETAILED DESCRIPTION

It should be noted that the structural and/or functional elements common to the different embodiments may have the same references. Thus, unless otherwise stated, such elements have identical structural, dimensional and material properties.

Furthermore, in the remainder of the description, the relative terms of the "horizontal" or "vertical" type are understood by reference to the common meaning given to them by a passenger on a seat with which the console according to the invention is associated.

FIGS. 1 and 2 show four seat units 10, namely two assemblies 11.1, 11.2 of two seat units 10 positioned one behind the other. Of course, the number of assemblies 11.1, 11.2 of seat units 10 positioned one behind the other in the form of a column may be greater than two. It is also possible to form columns of several individual seat units 10.

A seat unit 10 comprises at least one seat 12 associated with a side console 13 extending along one side of the seat 12 and with a shell 15 extending at least in part around the seat 12 so as to define a semi-closed space around the passenger. Such a configuration makes it possible to guarantee the privacy of the passenger on the seat 12. A video screen 16 of a multimedia system or IFE (Inflight Entertainment System) can be installed on a rear part of the privacy shell 15, as seen in FIG. 2.

The seat unit 10 may also conventionally include a meal shelf 18 movable between a stored position (corresponding to that shown in the figures), in which the meal shelf 18 is located inside a housing provided in the console 13, and an extended position in which the meal shelf 18 is located outside the housing.

The seat 12 is advantageously provided with a kinematics allowing it to be movable between a raised position, in which the seat 12 is configured to define a seating position of a passenger, and an inclined position, in which the seat 12 is configured to define a lying surface for the passenger, which is advantageously substantially horizontal.

The seat 12 comprises an axis of extension X1 defined by the intersection between a horizontal plane and a vertical median plane of the seat 12 corresponding to a plane of symmetry of the seat 12. The axis of extension X1 of the seat 12 may form a non-zero angle with respect to a central axis X2 of an assembly of two seat units 12. In this case, in the configuration shown, which is a herringbone configuration, the adjacent seats 12 of an assembly 11.1, 11.2 of two seat units 10 are turned towards the inside of the central axis X2 of said assembly 11.1, 11.2 of two seat units 10. As a variant, in a reverse herringbone configuration, the adjacent seats 12 of an assembly 11.1, 11.2 of two seat units 10 are turned outwards from the central axis X2 of said assembly 11.1, 11.2 of two seat units 10.

In the example shown, the console 13 has an upper wall 19 of horizontal orientation. The upper wall 19 forms a table surface on which a passenger can place objects. On the side of its rear end, there may be provided a vertical storage space 20 comprising one or more elements from a book pouch, a bottle holder, or a minibar. The choice of storage is configurable according to the wishes of the airline.

The console 13 may also include a reading light 22 as well as a control unit 23 for the seat and its environment (called "PCU" for "Passenger Control Unit"). The control unit 23 allows the passenger in particular to control the selection of a position of the seat 12 as well as the environment of the seat 12, namely a video system, a heating device, a light environment, or any other parameter of the seat environment.

A cavity 24 is located under the upper wall 19 forming a table surface. The cavity 24 is laterally open towards the seat 12 with which the console 13 is associated. As can be seen in FIG. 2, the cavity 24 is delimited by a front end face 25, a rear end face 26, and a bottom face 27 opposite the opening of the cavity 24. The bottom face 27 may extend in a direction parallel to or coincident with the central axis X2 of an assembly 11.1, 11.2 of two seat units 10.

The cavity 24 extends vertically between on the one hand a horizontal face 30 of the console 13 having in particular an armrest function on which a passenger can place part of his arm and on the other hand the upper wall 19 of the console 13. The horizontal face 30 may locally have the shape of a curved cuff 31 matching the shape of a part of the passenger's arm.

The upper wall 19 forming a table surface and the horizontal face 30 having in particular an armrest function are superimposed at least partly vertically with respect to each other, that is to say there is at least one vertical straight line intersecting both the upper wall 19 and the horizontal face 30. The upper wall 19 nevertheless has a recess in a lateral edge to allow the passenger easily access to the cuff form 31.

Furthermore, an articulated arm 32 is fixed to an internal face of the cavity 24. In this case, the articulated arm 32 is fixed to the bottom face 27. The articulated arm 32 comprises a holding device 33 for a portable electronic device 35 provided with a screen, such as an electronic tablet or a mobile phone of the Smartphone type.

The articulated arm 32 is movable between a stored position in which the arm is inside the cavity 24 and an extended position in which the articulated arm 32 is at least partly outside the cavity 24. The articulated arm 32 is configured so as to move in a horizontal plane in order to move from one position to another, that is to say a plane parallel to the upper wall 19.

As illustrated in FIG. 2, when the articulated arm 32 is in the stored position, the articulated arm 32 is preferably positioned against the bottom face 27 of the cavity 24.

Furthermore, the articulated arm 32 is configured such that, in the extended position, the holding device 33 (and therefore the portable electronic device 35) is located in front of the seat 12. The portable electronic device 35 may advantageously be located along an axis of extension of the seat 12.

In the extended position, the portable electronic device 35 is located between the seat 12 with which the arm is associated and the video screen 16 carried by the front seat unit 10. The portable electronic device 35 is preferably located in an area which does not obstruct the passenger's field of vision to the video screen 16.

In order to move from one position to another, the articulated arm 32 may be movable according to a combined movement of rotation and translation so as not to interfere with the internal volume of the cavity 24. In other words, the movement of the articulated arm 32 is made so that the articulated arm 32 does not come into contact with objects inside the cavity 24.

Thus, as can be seen in FIG. 2, the movement of the articulated arm 32 can be carried out in translation so that the articulated arm 32 remains positioned against the bottom face 27 of the cavity 24 according to a first part of its extension trajectory TD. The movement of the articulated arm 32 may be carried out in rotation about a vertical axis according to a second part of its extension trajectory TD. Guiding rails may be provided on the horizontal face 30 and/or on the upper wall 19 so as to guide the articulated arm 32 during its movement from one position to another. The movement of the articulated arm 32 is carried out so as not to interfere with the kinematics of the seat 12, nor with the kinematics of the meal table 18.

As a variant, the articulated arm 32 may be movable only in rotation via a pivot connection with a vertical axis on an internal face of the cavity 24. As a variant, the articulated arm 32 may be movable only in translation. As a variant, the articulated arm 32 could be a telescopic arm. As a variant, the articulated arm 32 could be fixed to the front end face 25 or the rear end face 26 of the cavity 24.

Furthermore, various embodiments of the holding device 33 for the screen can be envisaged alone or in combination. Thus, as illustrated in FIG. 3, the holding device 33 may include holding tabs 37 to be placed on either side of the portable electronic device 35 according to its thickness.

The holding device 33 may also include at least two jaws 38 capable of gripping at least a portion of the portable electronic device 35. The jaws 38 may for example move towards each other in two opposite directions which are parallel to one another longitudinal extension direction for the articulated arm 32.

In the embodiment in FIG. 4, the holding device 33 comprises at least one groove 40 for receiving an edge of the portable electronic device 35. The groove 40 may be defined for example by two adjacent teeth 41 projecting from an upper face of the articulated arm 32.

Of course the different features, variants and/or embodiments of the present invention can be associated with one another in various combinations insofar as they are not incompatible or exclusive with one another.

In addition, the invention is not limited to the embodiments described above and provided by way of example only. It encompasses various modifications, alternative forms and other variants a person skilled in the art may consider in the context of the present invention and in particular any combination of the various operating modes described above, which may be taken separately or in combination.

That which is claimed is:

1. A console for a seat unit comprising:
an upper wall forming a table surface on which a passenger can place objects,
a cavity,
an articulated arm fixed to an internal face of the cavity,
said articulated arm comprising a holding device for a portable electronic device provided with a screen,
said articulated arm being movable between a stored position, in which the articulated arm is located inside the cavity, and an extended position in which the articulated arm is at least in part outside the cavity,
wherein the cavity is located under the upper wall forming the table surface,
the cavity being laterally open towards the seat with which the console is associated,
the cavity being delimited by a front end face, a rear end face, and a bottom face opposite the opening of the cavity,
the cavity extending vertically between a horizontal face having an armrest function and the upper wall of the console, wherein the horizontal face is located below the upper wall, and wherein both the upper wall and the horizontal face are horizontally oriented,
wherein the articulated arm is configured so as to move only in a horizontal plane in order to move from the stored position to the extended position, and vice versa.

2. The console according to claim 1, wherein, when the articulated arm is in the stored position, said articulated arm is positioned against one face of the cavity.

3. The console according to claim 1, wherein the articulated arm is configured such that in the extended position the holding device for a portable electronic device is located along an axis of extension of a seat.

4. The console according to claim 1, wherein the articulated arm is movable in rotation and/or in translation with respect to the cavity in order to move from one position to another.

5. The console according to claim 1, wherein the holding device comprises holding tabs to be placed on either side of the portable electronic device.

6. The console according to claim 1, wherein the holding device comprises at least one groove for receiving an edge of the portable electronic device.

7. The console according to claim 1, wherein the holding device comprises at least two jaws capable of gripping at least a portion of the portable electronic device.

8. A seat unit comprising a seat and a console as defined in claim 1.

* * * * *